Aug. 1, 1939.  S. C. GEBERT  2,167,748
VARIABLE SPEED GEAR TRANSMISSION
Filed Nov. 29, 1937   4 Sheets-Sheet 1
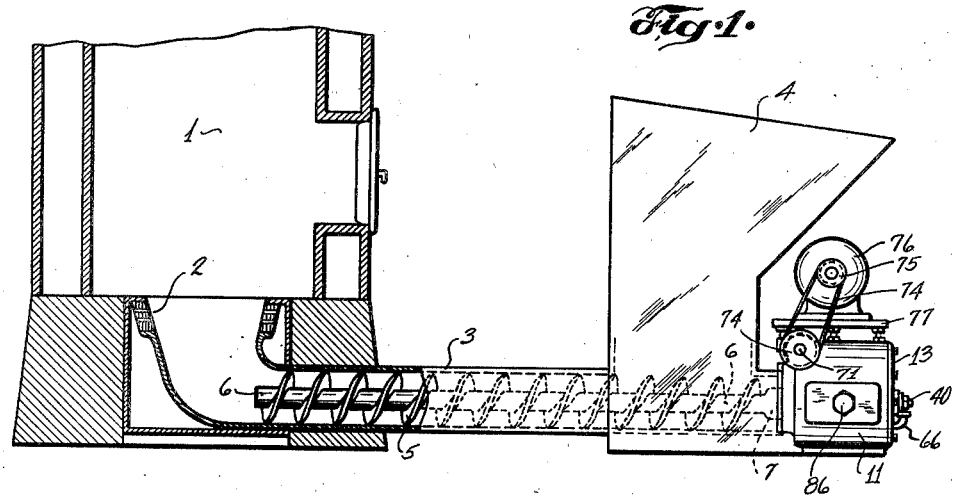
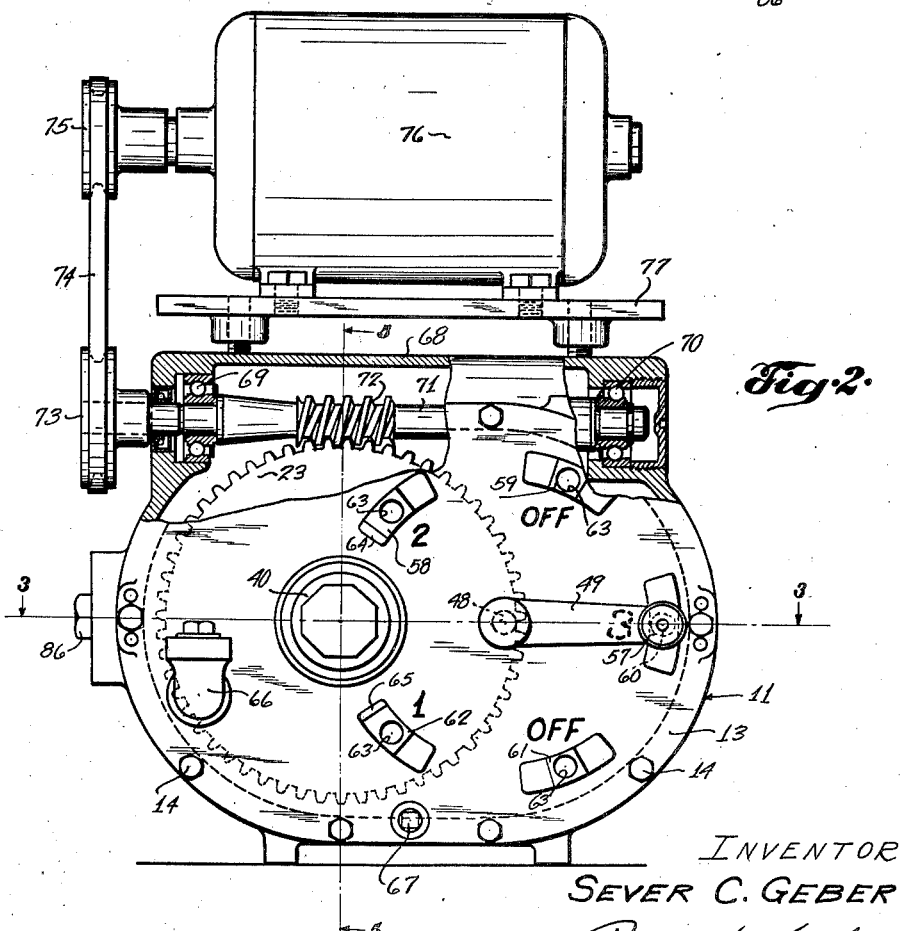
INVENTOR
SEVER C. GEBERT
By Paul L. Krohn
ATTORNEY.

Aug. 1, 1939.  S. C. GEBERT  2,167,748
VARIABLE SPEED GEAR TRANSMISSION
Filed Nov. 29, 1937  4 Sheets-Sheet 3

INVENTOR
SEVER C. GEBERT
BY *[signature]*
ATTORNEY

Aug. 1, 1939.   S. C. GEBERT   2,167,748
VARIABLE SPEED GEAR TRANSMISSION
Filed Nov. 29, 1937   4 Sheets-Sheet 4
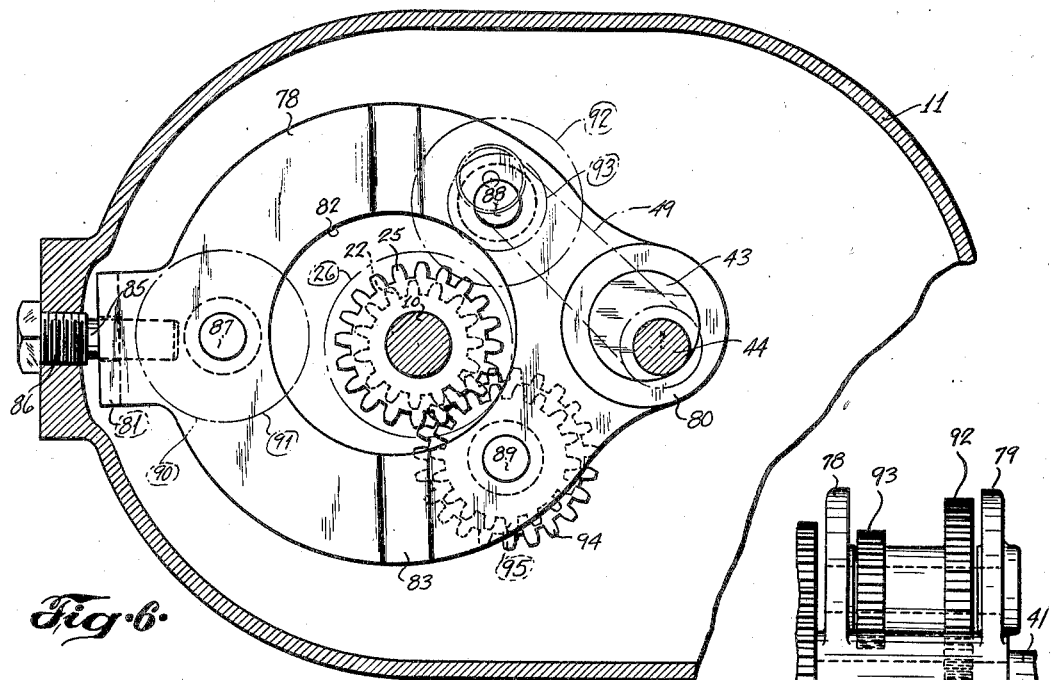
Fig. 6.
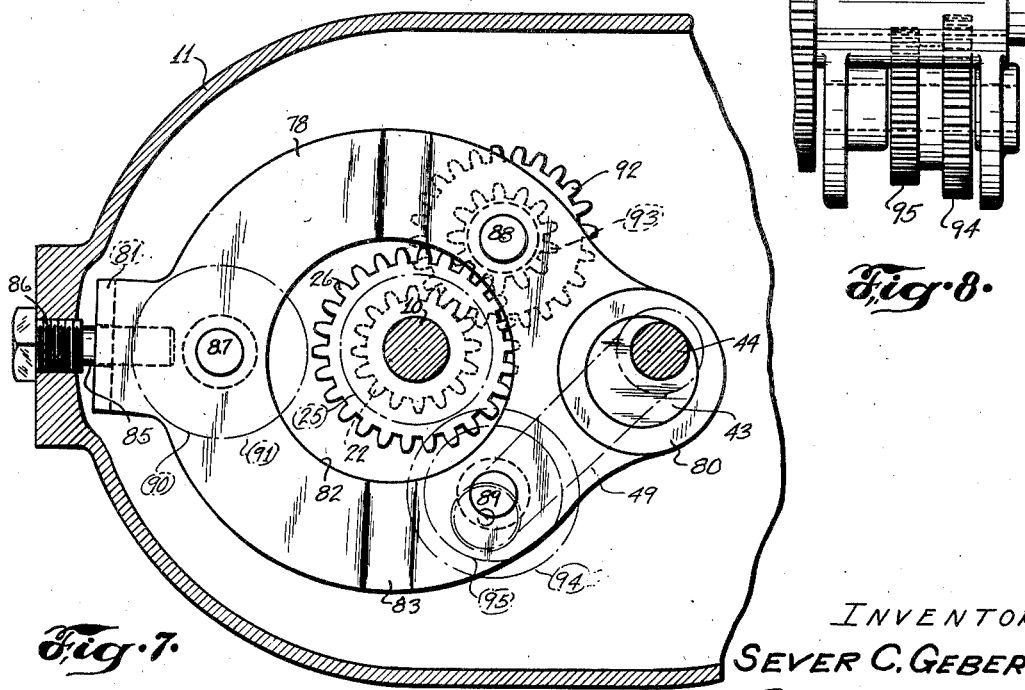
Fig. 7.
Fig. 8.
INVENTOR
SEVER C. GEBERT
By Paul L. Krohn
ATTORNEY Patented Aug. 1, 1939

2,167,748

UNITED STATES PATENT OFFICE 2,167,748

VARIABLE SPEED GEAR TRANSMISSION

Sever C. Gebert, Chicago, Ill., assignor to Fairbanks, Morse & Co., Chicago, Ill., a corporation of Illinois Application November 29, 1937, Serial No. 176,985

5 Claims. (Cl. 74—354)

This invention relates to an improved power unit especially adapted for driving the fuel feed screw of a mechanical stoker, and more particularly to an improved gear transmission, operatively interconnected between a power device and the stoker feed screw, for enabling the feed screw to be driven at any of a number of predetermined rates of speed.

An object of my invention is to provide a highly compact transmission unit of this character, so constructed that speed changes may be readily and quickly accomplished by a simple adjustment of a single control element.

Figure 3:
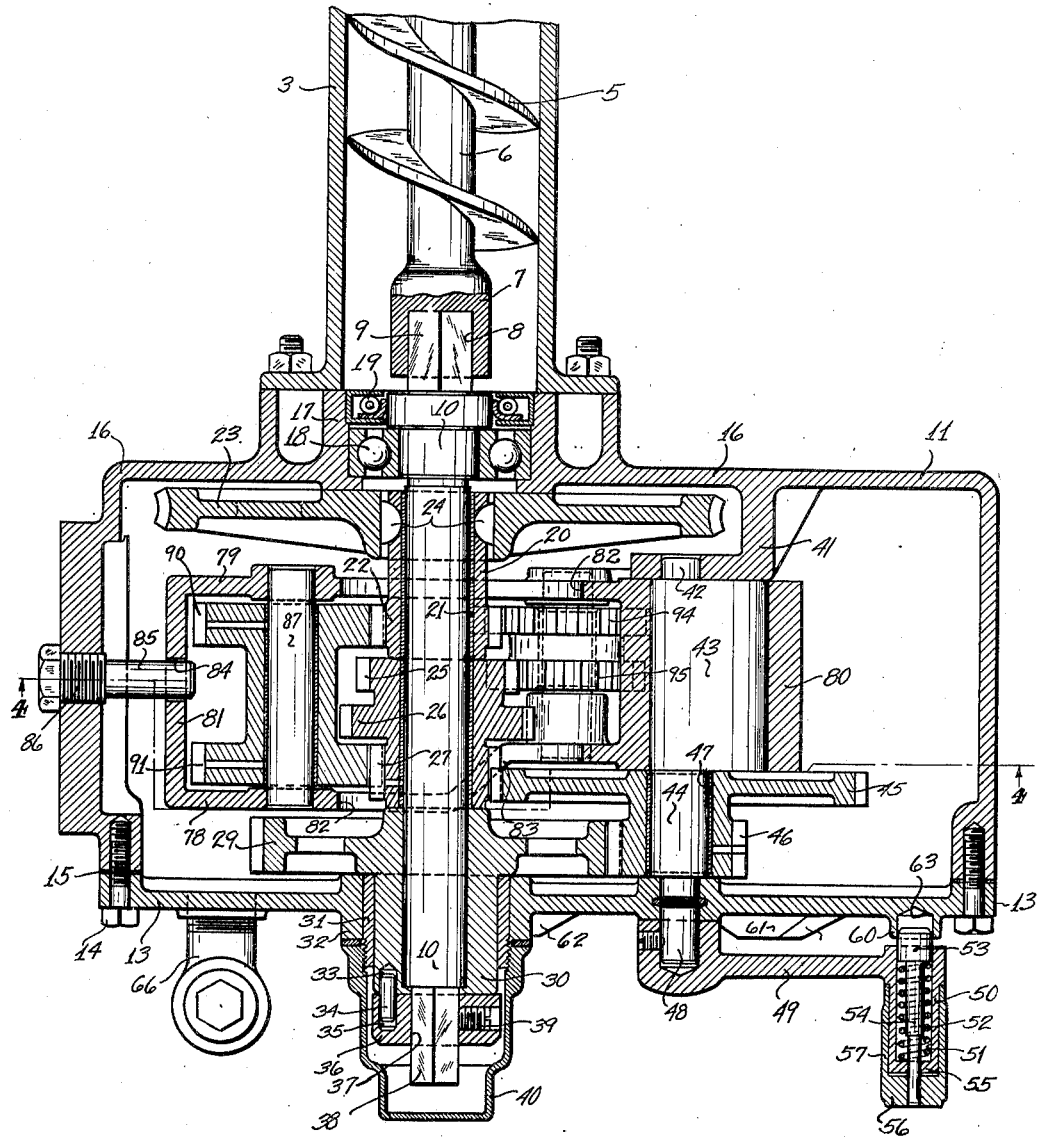
Figure 4:
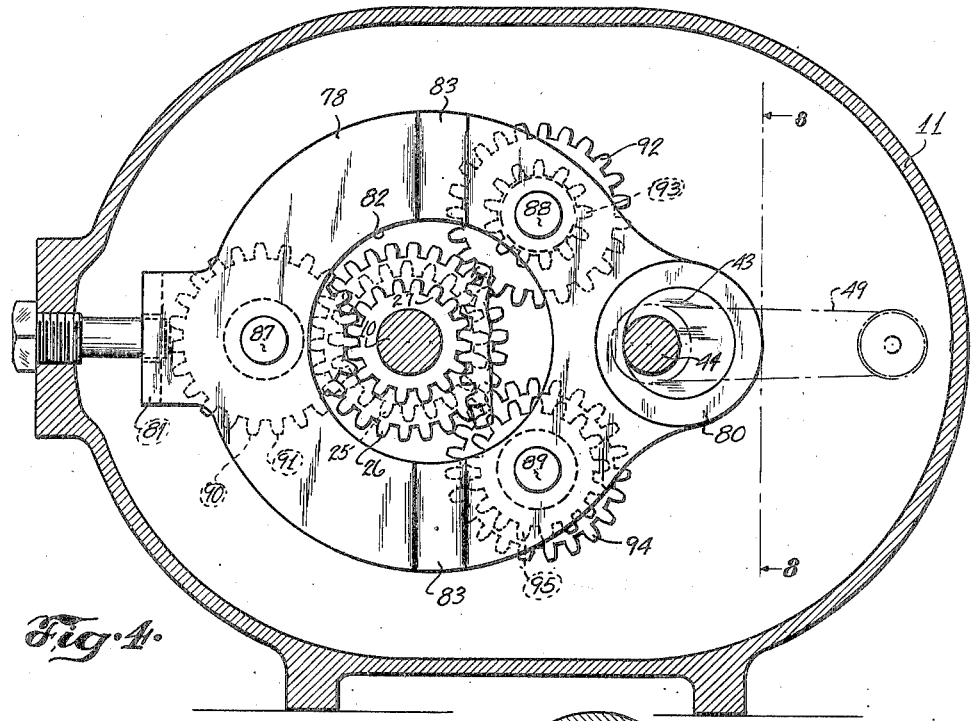
Figure 5:
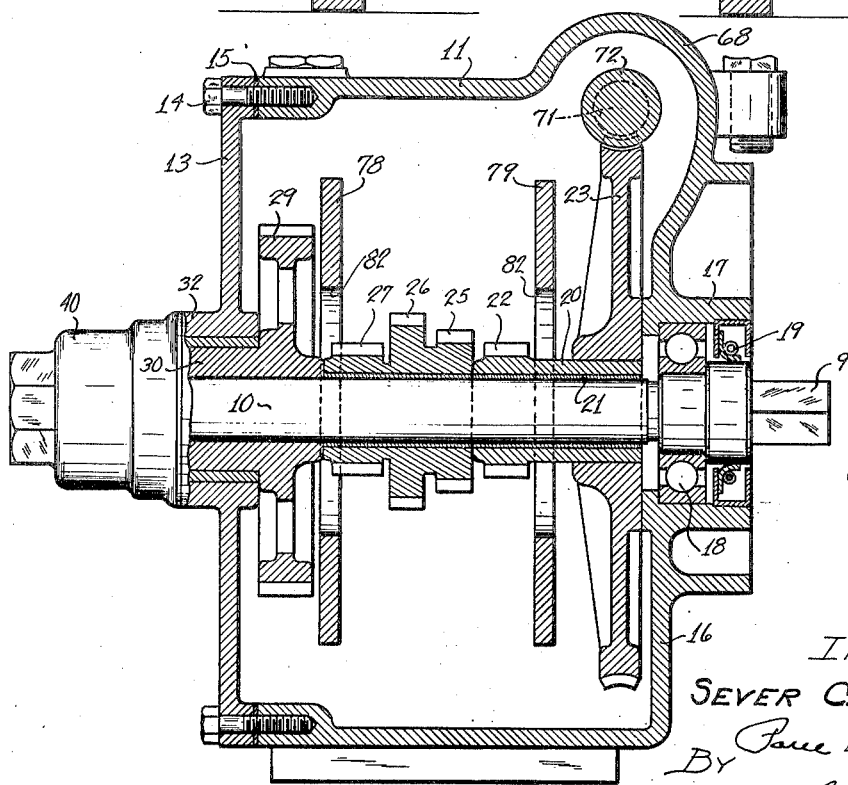

Other objects and advantages will appear from the following description and accompanying drawings wherein Fig. 1 is a side elevation of the device showing the same in connection with a stoker and furnace, the latter being shown in section; Fig. 2 is an end view of the transmission unit and its driving means, with parts broken away and in section; Fig. 3 is a longitudinal section taken at the line 3—3 of Fig. 2; Fig. 4 is a section taken at the line 4—4 of Fig. 3; Fig. 5 is a sectional view taken at line 5—5 of Fig. 2; Figs. 6 and 7 are fragmentary views showing the transmission gear cage in intermediate speed, and low speed feeding positions respectively, and Fig. 8 is a section taken on the line 8—8 of Fig. 4.

Referring to the drawings in detail, an application of my improved transmission assembly to a conventional mechanical stoker is illustrated in Fig. 1, wherein 1 represents a furnace or other heating device, 2 the fire pot thereof, 3 an underfeed fuel duct or conduit, and 4 a fuel hopper which connects at its bottom with the fuel duct so as to provide a relatively constant supply of fuel thereto. Extending longitudinally through the duct 3 is a screw conveyor 5 having a central shaft 6 which is provided at its outer end with an enlargement 7 in which is formed an angular recess 8. This recess may be either square as shown, or of any other non-circular shape to receive a correspondingly shaped end 9 of the transmission drive shaft 10.

The transmission consists of a casing 11 having a removable end plate 13 which is secured in place by bolts 14, a gasket 15 being compressed between the mating surfaces of the casing and end plate to form a liquid tight junction. The opposite end wall 16 of the casing is provided with an outwardly projecting circular boss 17 which is bored to receive a thrust bearing 18 that journals one end of the drive shaft 10, and a washer assembly 19 which protects the bearing 18 against coal dust and prevents the escape of lubricant from the transmission casing. The opposite end of drive shaft 10 is journalled and supported by end plate 13 in a manner hereinafter explained. Mounted on the shaft 10 within the casing is a sleeve 20 which may be bushed as at 21 with bearing metal of any suitable type, and formed integrally with this sleeve is a driving gear 22. A worm wheel 23 is secured on the sleeve 20 by means of keys 24 as shown, or may be otherwise secured on the sleeve, the essential feature being that the worm wheel 23, sleeve 20 and gear 22 operate as a unit. Mounted on shaft 10 for rotating relative thereto is an integral gear cluster composed of the gears 25, 26 and 27, such gear cluster being disposed adjacent to the gear 22. It should be understood that gear 22 and the cluster 25—26—27 are rotatable on shaft 10 relative to each other and to the said shaft.

Loosely mounted on the shaft 10 is a gear 29 having an axially projecting hub 30 which extends through a bearing bushing 31 carried by a boss 32 formed on the plate 13. The hub 30 is provided with a pore 33 into which a portion of a shear pin 34 extends, the remainder of such pin extending into a bore 35 formed in the collar 36, which collar is provided with an angular bore 37 to accommodate the correspondingly shaped end 38 of the shaft 10. By means of the collar 36 and shear pin, the gear 29 and shaft 10 are locked together for joint rotation. The collar 36 is held against longitudinal displacement on the angular portion of the shaft by a set screw 39. A removable cap 40, threaded to the end of the bushing 31, encloses the members on the end of shaft 10 and prevents oil leakage from the interior of the transmission case.

Formed on the interior of the wall 16 is a bracket 41 in which is journalled a trunnion 42 which projects from one end of the cam or eccentric 43. Projecting from the opposite end of the cam 43 is a shaft 44 which is in axial alignment with the trunnion 42 and which serves as a counter shaft for gears 45 and 46 which are provided with a bearing bushing 47 and rotate freely on the counter shaft 44. These gears may be integrally united as shown, or they may be made separate and secure together, it being essential that the gears 45 and 46 rotate together. The counter shaft 44 is provided with a reduced extension 48 which projects through and is journalled in the end plate 13. On the end of the shaft 48 is mounted a crank 49 which terminates at its free end in a cylindrical projection 50 provided with a bore 51 in which a coil spring 52 is located. A plunger 53 is slidably mounted in the bore 51 and is normally urged toward the end plate 13 by the coil spring 52. The plunger is provided with a stem or shaft 54 which projects centrally through the coil spring 52 and through the closed end 55 of the cylindrical projection 50. The stem or shaft 54 has its free end secured to the closed end 56 of a sleeve 57 which is slidably mounted on the cylindrical projection 50 and serves as a handle for effecting angular adjustment of cam 43. Plunger 53 is normally urged by the spring in an extended position for engagement with end plate 13 at any of a series of recesses 63 formed therein, and is adapted to be disengaged from the end plate by endwise manipulation of sleeve 57.

Located on the outer face of the end plate 13 (Fig. 2), are lands 58, 59, 60, 61 and 62. These lands are evenly spaced circumferentially about the shaft end 48 and located in the path of travel of the plunger 53. Each of the lands is provided with a bore 63 in which the plunger 53 can enter and thus lock the crank against accidental displacement. The lands 59, 60 and 61 have their opposite ends beveled so that the plunger 53 can ride up onto the same regardless of the direction of crank travel. Each of the lands 58 and 62 is beveled at on end and provided at the opposite end with an outstanding shoulder or stop, indicated at 64 and 65, these stops serving to limit the extent of angular movement of the crank.

Introduction of lubricant into the casing is made through a filler neck 66 extending from the end plate 13, and a drain opening having a threaded plug 67, also in the end plate 13, so as to enable withdrawal of the lubricant whenever desired.

The gear case is provided with an arcuate projection 68 (Fig. 5), forming a worm housing and in the ends of the housing are located thrust bearings 69 and 70 in which the worm shaft 71 is rotatably mounted. The worm flight 72 of shaft 71 drives the worm wheel 23. That end of the worm shaft which is journalled in the bearing 69 projects outwardly beyond the end of the worm housing and carries a pulley 73. A belt 74 operatively connects pulley 73 to pulley 75 on the shaft of the driving motor 76, the motor being mounted on a plate 77 carried by the transmission case.

Located within the transmission case and encircling gear 22 and gear cluster 25—26—27 is a cage structure or gear cage composed of spaced side plates 78 and 79. These plates are connected together at one end by a sleeve 80 in which the cam or eccentric 43 is journalled, and at the opposite end by a web or bridge piece 81. The side plates 78 and 79 are provided with aligned central openings 82 through which the shaft 10 passes, these openings being of such size that the idler frame can be freely moved by the cam 43 without contacting or interfering with any of the gears mounted on the shaft 10. The plate 78 is provided with an inward jog or bend as indicated by the numeral 83, so that the frame or cage is narrower at its cam end than at its web end. The gear 27 of the cluster, projects outwardly beyond one side of plate 78 and is in mesh with the countershaft gear 45 at all times. The bridge piece 81 is provided with an opening 84 which loosely receives a pin 85 projecting internally from the casing side wall. This pin is constituted by an axial extension of a bolt 86 threaded through the casing side wall and serves to support the web end of the cage, the opposite end of the cage being supported by the cam 43.

The plates 78 and 79 have secured therein in any well known manner, the ends of shafts 87, 88 and 89. These shafts extend across the space between the plates and have compound gears rotatably mounted thereon. The shaft 87 carries the integral gears 90 and 91; the shaft 88 carries integral gears 92 and 93, and the shaft 89 carries integral gears 94 and 95. The members 90, 92 and 94 of the compound cage gears are all of the same size and are disposed in the plane of gear 22 so that any one thereof, selectively, can be meshed with the gear 22, effected by lateral shifting movement of the cage. The gear 91 is axially spaced from its companion gear 90 and lies in the plane of gear 27 of the cluster; the gear 93 lies in the plane of gear 26 of the cluster and gear 95 lies in the plane of gear 25. The cage gears are circumferentially spaced around the frame structure which supports the same, the angular space between each set of cage gears being approximately 120 degrees. It will now appear that rotation of the cam or eccentric 43 by means of crank 49 imparts a pivotal or swinging motion to the cam end of the gear cage, the opposite end of the gear cage pivoting on the pin 85 which fits the opening in the bridge piece 81 with sufficient play to permit of the aforesaid lateral swinging movement. Continued turning of the eccentric causes the gear cage to be shifted bodily so that its bridge piece 81 travels along pin 85. Thus the described mounting provides for both pivotal and reciprocating movement of the gear cage, the off-center position of the gear cage with respect to the axis of shaft 10 being adjustable by means of crank 49. The cage gears are so dimensioned, and their locations on the cage frame so arranged with regard to the throw of eccentric 43 that only one set thereof is capable of being enmeshed with the gears on shaft 10 at a particular time. In certain so-called intermediate portions of the eccentric, none of the cage gears operatively engage the shaft gears, which, of course, produces a gap in the driving sequence.

From the foregoing description it will appear that the worm wheel 23 is operatively connected at all times with motor 76, and is adapted to be driven by the motor at a relatively reduced speed, through the pulleys 73 and 75, belt 74 and worm shaft 71. Worm wheel 23 is directly connected to gear 22 by sleeve 20 which is loosely disposed on the main drive shaft 10. In axial adjacence with gear 22 on shaft 10 is the integral gear cluster composed of gears 25, 26 and 27, such gear cluster being loose on shaft 10 for rotation relative to the shaft and to the gear 22. The end gear 27 of the cluster is enmeshed at all times with gear 45, journalled on countershaft 44, the gear 27 serving to drive gear 29, loosely disposed on main shaft 10, through gear 46. Gear 29 is operatively connected to shaft 10 through shear pin 34 and collar 36.

In the explanation thus far, no mention has been made of the means by which rotation of gear 22 is imparted to the gear cluster adjacent thereto. Such means are found in the laterally shiftable cage structure with its associated sets of compound gears which, selectively, link gear 22 and the gear cluster. Such means enable the gear cluster, and hence the conveyor feed screw, to be driven at a number of different rates of speed and the construction, assembly and mounting arrangement thereof constitute a highly important part of the present invention.

As illustrated in Fig. 4 and heretofore described, the gear carriage or frame, characterized by the side plates 78 and 79, encircles the shaft 10 and is adapted to be shifted in a plane at right angles to said shaft by means of the eccentric or cam 43. Adjustment of cam 43 is under the control of crank 49, and when the latter is temporarily locked by its plunger 53 in the position indicated in Fig. 7, operative connection between gear 22 and gear 27 of the cluster is effected through the compound gear 92—93 mounted on the carriage. Due to the relative proportions of the component gears of recited train, a slow speed condition of the conveyor worm shaft results. If an intermediate speed condition of the worm shaft is desired, crank 49 is moved and locked at position designated 2 on the end plate 13 (Fig. 2) which causes disengagement of compound gear 92—93 with gears 22 and 27 and engagement of compound gear 94—95 with gears 22 and 25. A further adjustment of crank 49 may be effected to shift the gear frame and replace the intermediate speed gear 94—95 with high speed gear 90—91 in the described train. Two neutral or "off" positions of the crank 49 are provided for, and when the crank is disposed in either of such positions, all three of the designated compound speed change gears are disengaged from gear 22 and the integral gear clutch 25—26—27, which, of course, interrupts the continuity of the gear train and no power is transmitted to the screw conveyor.

Having fully described my invention, what I claim and desire to secure by Letters Patent is:

1. A variable-speed transmission including a casing, a shaft journalled in said casing, a driving gear loosely disposed on said shaft, a cluster of integrally united gears on said shaft, a train of gears operatively connecting said gear cluster and shaft, a cage structure encircling said shaft, a plurality of dual compound gears carried by the cage structure, each of said compound gears having one of its members disposed in the plane of said driving gear and its other member disposed in the plane of one of the gears of said cluster, means on the casing supporting one side of said cage structure for pivotal and reciprocating movement, an eccentric mounted in the casing at the opposite side of the cage structure, adapted to impart pivotal and reciprocating movement thereto whereby to place any selected one of the cage gears into operative engagement with said driving gear and said gear cluster.

2. In a variable speed transmission, a casing, coaxial driving and driven gears therein, a gear cage encircling the driving and driven gears comprising a pair of axially spaced annular discs and a plurality of compound, intermediate gears spaced circumferentially around and disposed between the discs, means on the casing at one side of the gear cage, supporting the gear cage for both reciprocating and pivotal movement in a plane tranversely of the axis of the driving and driven gears, and an eccentric coacting with the diametrically opposite side of the gear cage for imparting movement as aforesaid to the gear cage whereby to enmesh any selected intermediate gear with the driving and driven gears.

3. In a variable speed transmission, a casing, coaxial driving and driven gears therein, a gear cage encircling the driving and driven gears, comprising a pair of axially spaced annular discs having a plurality of compound gears mounted between and spaced circumferentially around the discs, a bridge piece interconnecting outer peripheral portions of said discs, an internal projection on the casing engaging said bridge piece and supporting the gear cage for both reciprocating and pivotal movement in a plane transverse to the axis of the driving and driven gears, a control shaft having an eccentric thereon journalled in a peripheral portion of the gear cage opposite to said bridge piece, said eccentric being adapted to impart the aforesaid movement to the gear cage whereby to place any selected one of the compound gears into operative engagement with the driving and driven gears.

4. In a variable speed transmission, a casing, a main shaft therein, a driving gear and a compound driven gear loosely mounted on said shaft, a gear train operatively interconnecting said driven gear and shaft, a gear cage encircling the driving and driven gears, comprising axially spaced annular discs, an apertured bridge member and a sleeve disposed on relatively opposite sides of the cage structure, connecting the discs together, a plurality of circumferentially spaced compound gears carried by and disposed between said discs, said intermediate gears being adapted, selectively, to interconnect the driving and driven gears, a pin projecting from the casing through the aperture in said bridge member, said pin serving to support one side of the gear cage for reciprocating and pivotal movement in a plane transverse to the main shaft; a cam rotatable in said sleeve for moving the gear cage, whereby to place any selected intermediate gear in operative engagement with the driving and driven gears.

5. A variable speed transmission including a casing, a main shaft and a countershaft journalled therein, a first gear fixed to the main shaft, a cluster gear loosely mounted on the main shaft, a compound gear loosely mounted on the countershaft and meshing with said first gear and cluster gear, said countershaft having an eccentric formed thereon, a third gear coaxial with said cluster and rotatable relative thereto, an annular frame encircling said main shaft, a sleeve for said eccentric formed on one side of said frame, means on said casing engaging the opposite side of said frame, said means serving to support the frame for reciprocating and pivotal movement as imparted to the frame by said eccentric, a plurality of compound gears spaced about and journalled on said frame, said countershaft serving as a means for shifting the frame whereby any selected one of the frame gears may be intermeshed with said cluster gear and third gear.

SEVER C. GEBERT.